United States Patent
Yanagi (10) Patent No.: US 12,556,406 B2
(45) Date of Patent: Feb. 17, 2026

(54) COMMUNICATION SYSTEM, SERVER, AND FUNCTION EXECUTING DEVICE

(71) Applicant: BROTHER KOGYO KABUSHIKI KAISHA, Nagoya (JP)

(72) Inventor: Satoru Yanagi, Obu (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/809,959

(22) Filed: Aug. 20, 2024

(65) Prior Publication Data

US 2025/0070986 A1 Feb. 27, 2025

(30) Foreign Application Priority Data

Aug. 21, 2023 (JP) .................. 2023-134209

(51) Int. Cl.
*H04L 9/32* (2006.01)
(52) U.S. Cl.
CPC .......... *H04L 9/3247* (2013.01); *H04L 9/3231* (2013.01)
(58) Field of Classification Search
CPC ................................................. H04L 9/3247
See application file for complete search history.

(56) References Cited

U.S. PATENT DOCUMENTS

| | | | |
|---|---|---|---|
| 9,189,777 B1* | 11/2015 | Dickinson | G06Q 20/3829 |
| 2012/0236359 A1* | 9/2012 | Mihara | G06F 3/1205 |
| | | | 358/1.15 |
| 2016/0112493 A1* | 4/2016 | Yasuhara | H04L 63/10 |
| | | | 709/219 |
| 2019/0268336 A1* | 8/2019 | Gomi | H04W 12/069 |
| 2023/0318853 A1* | 10/2023 | Kim | H04L 63/0876 |
| | | | 713/156 |

FOREIGN PATENT DOCUMENTS

| | | |
|---|---|---|
| JP | 2016-081345 A | 11/2006 |
| JP | 2012-137855 A | 7/2012 |
| JP | 2012-190400 A1 | 10/2012 |

* cited by examiner

*Primary Examiner* — Ponnoreay Pich (74) *Attorney, Agent, or Firm* — KENEALY VAIDYA LLP (57) ABSTRACT

A communication system may include a function executing device, a terminal device and a server. The server may, in a case where a first login request is received from the function executing device and a second login request is received from the terminal device, send operation acceptance screen data to the terminal device. The terminal device may display an operation acceptance screen on a display unit and, in a case where the function executing operation is accepted on the operation acceptance screen, send operation information to the server. The server may, in a case where the operation information is received from the terminal device, send the function executing device a function executing instruction. The function executing device may, in a case where the function executing instruction is received from the server, cause a function executing engine of the function executing device to execute the specific function.

12 Claims, 8 Drawing Sheets

User Table 242

| User ID | Public Key | First Login Information | Second Login Information |
|---|---|---|---|
| user1 | PUK1, PUK2 | ON | ON |
| ... | ... | ... | ... |

First Service Table

| Device ID | Authencication Token | Capability Information | User ID | Authority Information | Connection Information |
|---|---|---|---|---|---|
| DV1 | tk1 | Print | user1 | Administrator | Maintain |
| | | | user2 | General User | Disconnect |
| ... | ... | ... | ... | ... | ... |

Second Service Table 246

| User ID | Device ID | Authentication Token | Remaining Amount Information |
|---|---|---|---|
| user1 | DV1 | tk11 | 80 |
| ... | ... | ... | ... |

COMMUNICATION SYSTEM, SERVER, AND FUNCTION EXECUTING DEVICE

REFERENCE TO RELATED APPLICATION

This application claims priority to Japanese Patent Application No. 2023-134209 filed on Aug. 21, 2023. The entire content of the priority application is incorporated herein by reference.

BACKGROUND ART

A print system including a client terminal, a plurality of printers, and a printer server is known. The client terminal sends a login request to the printer server. The printer server creates a screen data corresponding to a screen for selecting a printer to be caused to execute printing using print data, and sends the screen data to the client terminal. In response to receiving the screen data from the printer server, the client terminal displays the screen for selecting a printer to be caused to execute printing using print data. In response to a printer being selected by a user, the client terminal causes the printer to execute its print function.

SUMMARY

Disclosed herein is a communication system comprising a function executing device, a terminal device, and a server. The function executing device may comprise a first controller, and the first controller may be configured to send the server a first login request including user identification information for identifying a user. The terminal device may comprise a second controller, and the second controller may be configured to send the server a second login request including the user identification information. The server may comprise a third controller, and the third controller may be configured to: receive the first login request from the function executing device; receive the second login request from the terminal device; and in a case where the first login request is received from the function executing device and the second login request is received from the terminal device, send operation acceptance screen data corresponding to an operation acceptance screen to the terminal device, the operation acceptance screen being for accepting a function executing operation to cause the function executing device to execute a specific function. The second controller may be further configured to: after the second login request has been sent to the server, receive the operation acceptance screen data from the server; in a case where the operation acceptance screen data is received from the server, display the operation acceptance screen on a display unit of the terminal device; and in a case where the function executing operation is accepted on the operation acceptance screen, send operation information corresponding to the function executing operation to the server. The third controller may be further configured to: receive the operation information from the terminal device; and in a case where the operation information is received from the terminal device, send the function executing device a function executing instruction to cause the function executing device to execute the specific function. The first controller may be further configured to: receive the function executing instruction from the server; and in a case where the function executing instruction is received from the server, cause a function executing engine of the function executing device to execute the specific function.

Further disclosed herein is a server. The server may comprise a controller. The controller may be configured to: receive a first login request including user identification information for identifying a user from a function executing device; receive a second login request including the user identification information from a terminal device; in a case where the first login request is received from the function executing device and the second login request is received from the terminal device, send operation acceptance screen data corresponding to an operation acceptance screen to the terminal device, the operation acceptance screen being for accepting a function executing operation to cause the function executing device to execute a specific function; after the operation acceptance screen data has been sent to the terminal device, receive operation information corresponding to the function executing operation from the terminal device; and in a case where the operation information is received from the terminal device, send the function executing device a function executing instruction to cause the function executing device to execute the specific function.

Further disclosed herein is a function executing device. The function executing device may comprise a function executing engine for executing a specific function and a controller. The controller may be configured to: send a first login request including user identification information for identifying a user to a server, wherein the server may be configured to: in a case where the first login request is received from the function executing device and a second login request including the user identification information is received from a terminal device, send operation acceptance screen data corresponding to an operation acceptance screen to the terminal device, the operation acceptance screen being for accepting a function executing operation to cause the function executing device to execute the specific function; and in a case where operation information corresponding to the function executing operation is received from the terminal device after the operation acceptance screen data has been sent to the terminal device, send the function executing device a function executing instruction to cause the function executing device to execute the specific function, receive the function executing instruction from the server; and in a case where the function executing instruction is received from the server, cause the function executing engine to execute the specific function.

According to the configuration above, in the case where the server receives the first login request from the function executing device and receives the second login request from the terminal device, the server sends the operation acceptance screen data to the terminal device. In response to receiving the operation information from the terminal device, the server sends the function executing instruction to the function executing device. In response to receiving the function executing instruction from the server, the function executing device causes the function executing engine to execute the specific function. Thus, the server receiving the first and second login requests triggers the execution of the specific function by the function executing engine of the function executing device.

Computer-readable instructions for the server above, a non-transitory computer-readable recording medium storing the computer-readable instructions, and a method performed by the server are also novel and useful. Further, computer-readable instructions for the function executing device above, a non-transitory computer-readable recording medium storing the computer-readable instructions, and a method performed by the function executing device are also novel and useful.

DESCRIPTION

Figure 1:
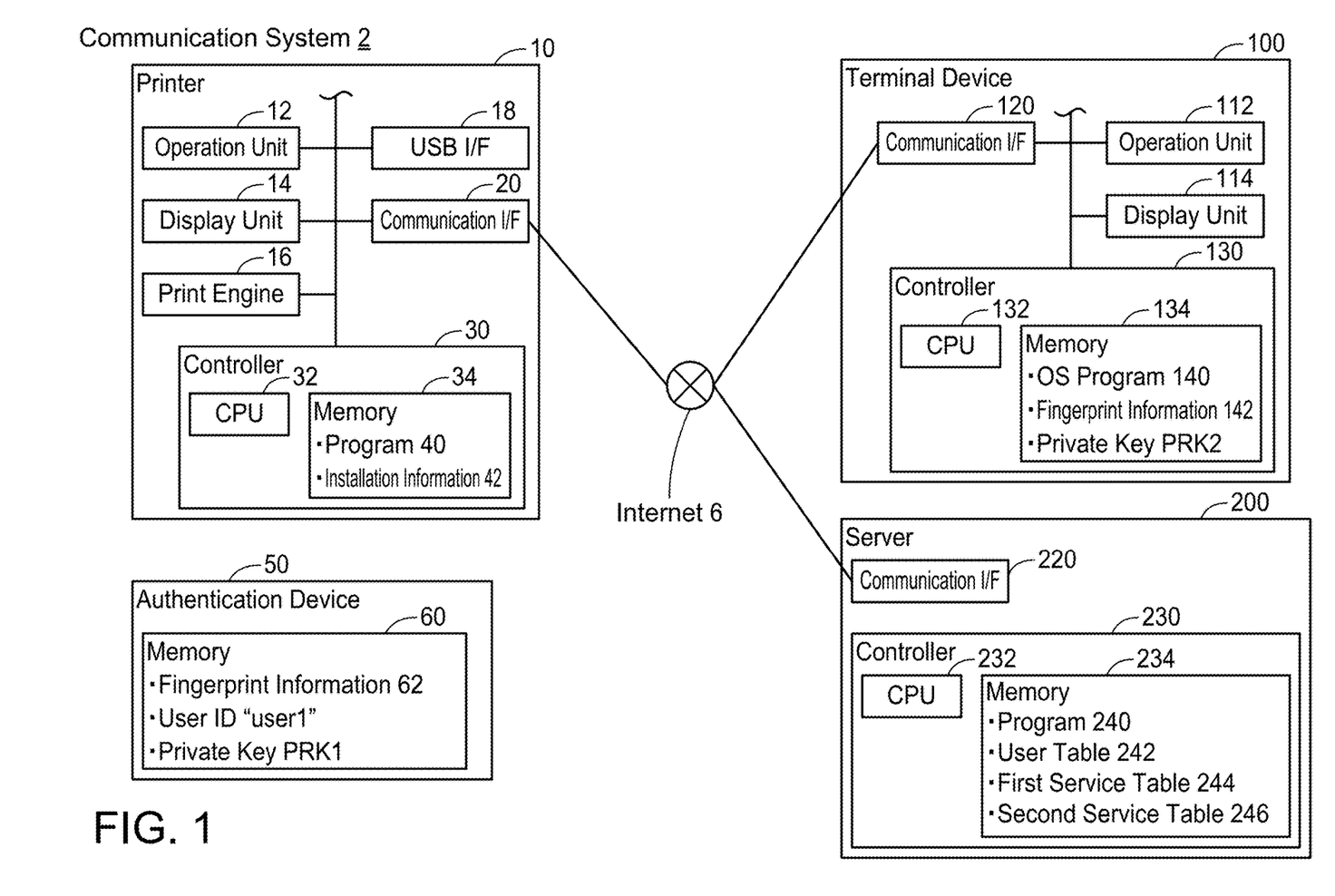
FIG. 1 shows a configuration of a communication system.

Embodiments (Configuration of Communication System 2: FIG. 1)

As shown in FIG. 1, a communication system 2 comprises a printer 10, an authentication device 50, a terminal device 100, and a server 200. The printer 10, the terminal device 100, and the server 200 are connected to the internet 6. The printer 10, the terminal device 100, and the server 200 can communicate with each other via the internet 6.

(Configuration of Printer 10)

The printer 10 is a peripheral device (e.g., a peripheral device of the terminal device 100) configured to execute a print function. The printer 10 has a device ID "DV1". The device ID is a name assigned by the administrator of the printer. The printer 10 is configured to operate according to FIDO (Fast Identity Online) authentication scheme using a pair of keys. The FIDO authentication scheme uses a pair of keys, namely a private key and a public key. Further, the FIDO authentication scheme executes user authentication using biometric authentication (e.g., fingerprint authentication, voice authentication, face authentication) instead of using authentication with a password. Hereinafter, authentication according to the FIDO authentication scheme is termed "FIDO authentication".

The printer 10 comprises an operation unit 12, a display unit 14, a print engine 16, a USB interface 18, a communication interface 20, and a controller 30. Hereinafter, an interface may be abbreviated as "I/F".

The operation unit 12 is an interface for inputting various information to the printer 10 and includes buttons, a touch screen, etc. The display unit 14 is a display or a panel for displaying various information. The panel may be or may not be a touch screen. The panel is for example a liquid crystal panel or an organic EL panel. The print engine 16 is of an electrophotographic scheme, an inkjet scheme, or a thermal scheme. The USB I/F 18 is configured to allow a USB connector to be connected thereto. The communication I/F 20 is for communication with other devices. The communication I/F 20 is connected to the internet 6. The communication I/F 20 may be a wired I/F or a wireless I/F.

The controller 30 comprises a CPU 32 and a memory 34. The memory 34 includes a main storage and an auxiliary storage. The main storage includes a RAM and a cache memory, although this is merely an example. The auxiliary storage may be an ROM, a flash memory, a solid-state drive (SSD), a hard disk drive (HDD), or a combination thereof, although this is merely an example. A program 40 and installation information 42 are stored in the auxiliary storage of the memory 34. The CPU 32 executes various processes according to a program loaded from the auxiliary storage to the main storage. The installation information 42 indicates the location in which the printer 10 is installed. As the installation information 42, one of the following information is stored: "PUBLIC" indicating that the printer 10 is installed in a place available to a large number of unspecified people such as a convenience store; "OFFICE" indicating that the printer 10 is installed in a place available to a large number of specified people such as an office; and "HOME" indicating that the printer 10 is installed in a private home. The installation information 42 can be set by the administrator of the printer 10.

(Configuration of Authentication Device 50)

The authentication device 50 is configured to operate according to the FIDO authentication scheme. The authentication device 50 operates as a so-called authentication device in the FIDO authentication scheme. The authentication device 50 includes a USB cable (not shown) with a USB connector and a memory 60. The memory 60 includes a main storage and an auxiliary storage. Fingerprint information 62, a user ID "user1", and a private key PRK1 are stored in the auxiliary storage of the memory 60. The fingerprint information 62 is related to fingerprints of a user of the terminal device 100. Hereinafter, the user of the terminal device 100 may be termed "target user". The user ID "user1" is information for identifying the target user. The private key PRK1 is used when FIDO authentication is executed. The private key PRK1 is registered when a registration process in which a pair of keys to be used for FIDO authentication is registered is executed between the printer 10 and the server 200.

(Configuration of Terminal Device 100)

The terminal device 100 is a portable terminal device such as a mobile phone (e.g., a smartphone), a PDA, a tablet PC, or the like. The terminal device 100 comprises an operation unit 112, a display unit 114, a communication I/F 120, and a controller 130.

The operation unit 112 is for example a touch screen. The operation unit 112 is configured to accept various instructions. The operation unit 112 also functions as a fingerprint authenticator. The display unit 114 is a display or a panel for displaying various information. The communication I/F 120 is for communication with other devices. The communication I/F 120 is connected to the internet 6.

The controller 130 comprises a CPU 132 and a memory 134. The memory 134 includes a main storage and an auxiliary storage. An operating system (OS) program 140, fingerprint information 142, and a private key PRK2 are stored in the auxiliary storage of the memory 134. The OS program 140 controls basic operations of the terminal device 100. The CPU 132 executes various processes according to a program loaded from the auxiliary storage to the main storage. The fingerprint information 142 is related to fingerprints of the target user. The private key PRK2 is used when FIDO authentication is executed. The private key PRK2 is registered when a registration process in which a pair of keys to be used for FIDO authentication is registered is executed between the terminal device 100 and the server 200.

(Configuration of Server 200)

The server 200 is installed on the internet 6 and provided for example by the vendor of the printer 10. In a modification, the server 200 may be installed on the internet 6 by a business operator different from the vendor. In another modification, the vendor may not prepare hardware for the server 200 on their own and use an environment provided by an external cloud computing service. In this case, the vendor may prepare a program (i.e., software) for the server 200 and introduce it to the above-mentioned environment to implement the server 200. The server 200 is configured to operate according to the FIDO authentication scheme. The server 200 operates as a so-called authentication server in the FIDO authentication scheme.

The server 200 functions as a server configured to provide a mediation service related to the printer 10. The mediation service is a service for operating the printer 10 via the server 200. In the mediation service, the server 200 sends the printer 10 an instruction that is based on information received from the terminal device owned by the user, by using an XMPP (Extensible Messaging and Presence Protocol) connection. The XMPP connection is a so-called constant connection. The server 200 can send signals to the printer 10 beyond the firewall of the LAN to which the printer 10 belongs, without receiving requests from the printer 10. The server 200 may send requests to the printer 10 not by the XMPP connection but by another way. For example, an HTTPS (Hypertext Transfer Protocol Secure) connection may be established between the printer 10 and the server 200.

The server 200 also functions as a server configured to provide a subscription service related to the printer 10. The subscription service is a flat-rate print service. The flat-rate print service charges a flat fee if the number of printed sheets within a predetermined time period (e.g., within a month) is equal to or less than the contractual number of sheets (e.g., 1000 sheets), while if the number of printed sheets within the predetermined time period exceeds the contractual number of sheets, it charges the sum of the flat fee and a fee for the extra sheets beyond the contractual number of sheets. The subscription service includes an automatic shipping service that automatically ships a new cartridge when the remaining amount of ink in a cartridge mounted in a printer becomes equal to or less than a predetermined remaining amount. The subscription service uses the XMPP connection established with the printer 10. For example, under the state where the subscription service is available (termed "available state" hereinafter), the server 200 regularly sends the printer 10, via the XMPP connection, a signal that requests sending of remaining amount information indicating the ink remaining amount in the cartridge and sheet information indicating the number of printed sheets. As above, the mediation service and the subscription service use the constant connection (i.e., XMPP connection).

The server 200 comprises a communication I/F 220 and a controller 230. The communication I/F 220 is for communication with other devices. The communication I/F 220 is connected to the internet 6. The controller 230 comprises a CPU 232 and a memory 234. The memory 234 includes a main storage and an auxiliary storage. A program 240, a user table 242, a first service table 244, and a second service table 246 are stored in the auxiliary storage of the memory 234. The CPU 232 executes various processes according to a program loaded from the auxiliary storage to the main storage.

Figure 2:
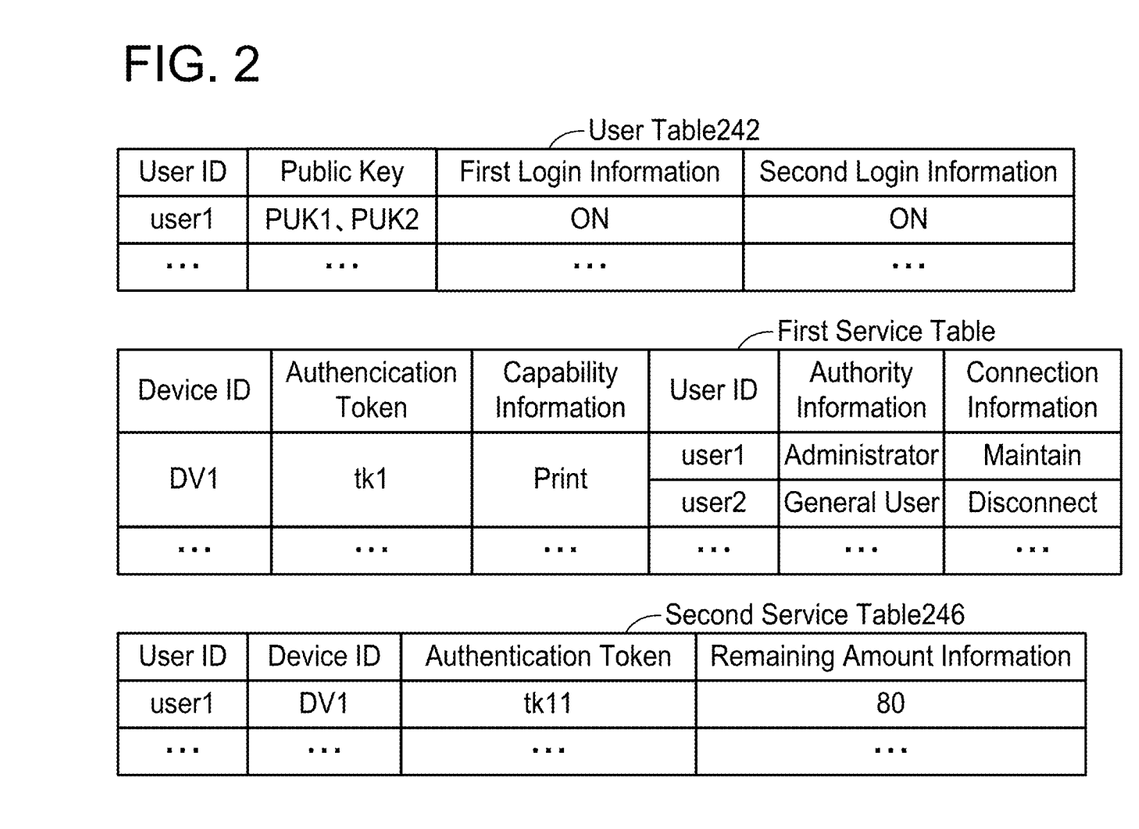
FIG. 2 shows examples of tables.

(Contents of Tables: FIG. 2)

Referring to FIG. 2, contents of the user table 242, the first service table 244, and the second service table 246 in the server 200 are described.

The user table 242 manages user-related information. In the user table 242, user IDs, public keys, first login information, and second login information are stored in association with each other. Each public key is registered when the registration process in which a pair of keys to be used in FIDO authentication is registered is executed. Each first login information indicates either one of: "ON" indicating that the user is logged in the server 200 via a printer or "OFF" indicating that the user is not logged in the server 200 via a printer. Each second login information indicates either one of: "ON" indicating that the user is logged in the server 200 via a terminal device or "OFF" indicating that the user is not logged in the server 200 via a terminal device.

The first service table 244 manages information related to the mediation service. In the first service table 244, device IDs, authentication tokens, capability information, user IDs, authority information, and connection information are stored in association with each other. Each authentication token is authentication information for establishing an XMPP connection between the printer 10 and the server 200. Each capability information indicates a function that can be executed by the device identified by a device ID associated with this capability information. Each authority information indicates either one of: "administrator" indicating that the user is the administrator of a printer or "general user" indicating that the user is a general user. Each connection information is used to determine whether an XMPP connection established for provision of the mediation service is to be maintained or not when a logout request is received from a printer. Each connection information indicates either one of: "Maintain" indicating that the XMPP connection is to be maintained or "Disconnect" indicating that the XMPP connection is to be disconnected.

The second service table 246 manages information related to the subscription service. In the second service table 246, user IDs, device IDs, authentication tokens, and remaining amount information are stored in association with each other.

(Specific Cases A to G: FIGS. 3 to 8)

Referring to FIGS. 3 to 8, specific Cases A to G, which can be realized by the communication system 2 according to the present embodiment, are described. In the following description, the CPUs of the respective devices (e.g., the CPU 32 of the printer 10) are not described as the subjects of actions, but the respective devices (e.g., the printer 10) are described as the subjects of actions instead. Communications between the printer 10, the terminal device 100, and the server 200 are via the communication I/Fs of the respective devices (e.g., the communication I/F 20 of the printer 10). Thus, in the following description, wording "via the communication I/F" is omitted for processes involving communications via the communication I/Fs. Further, communications between the printer 10 and the authentication device 50 are via the USB I/Fs of the devices (e.g., the USB I/F 18 of the printer 10). Thus, in the following description, wording "via the USB I/F" is omitted for processes involving communications via the USB I/F.

Figure 3:
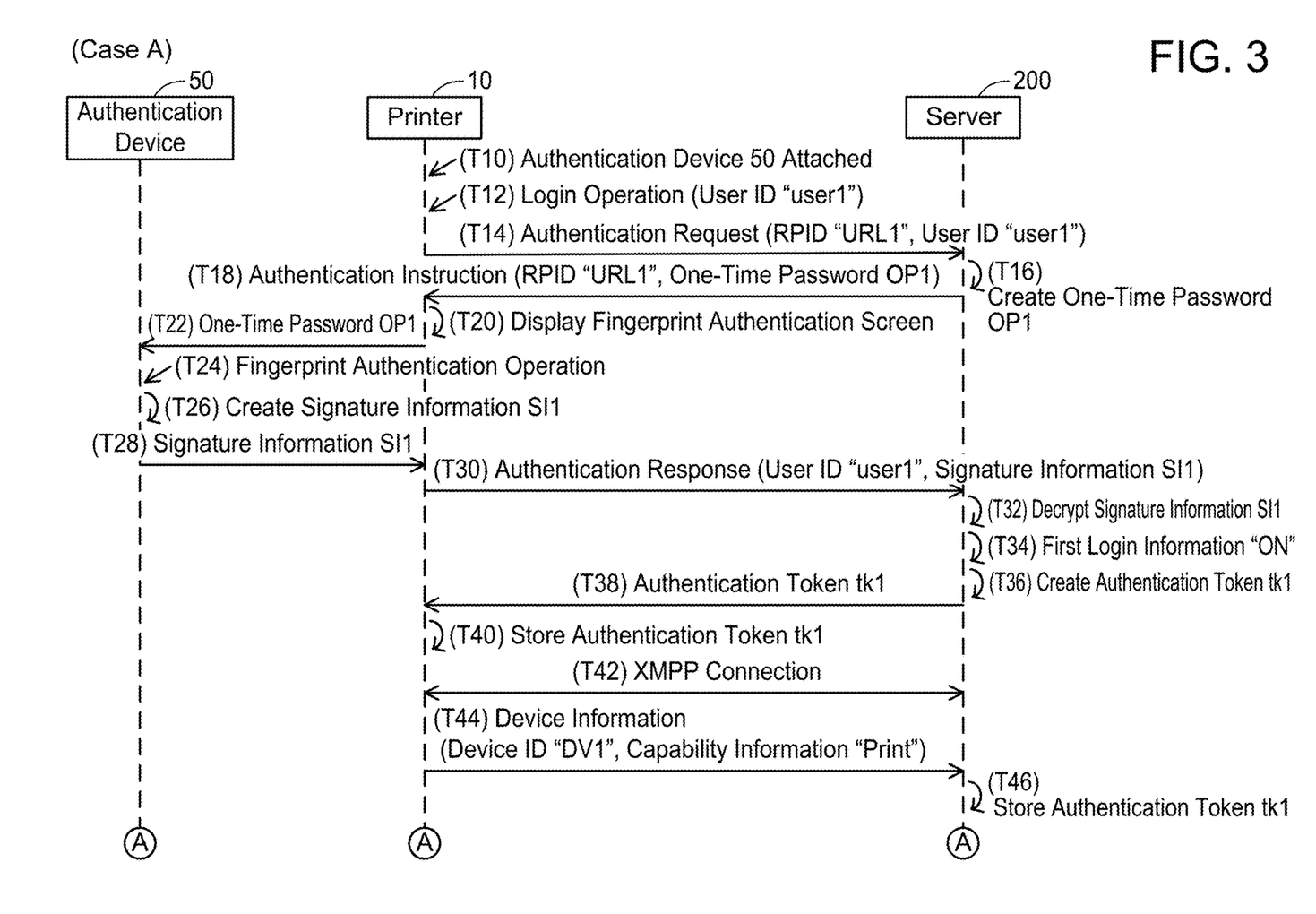
FIG. 3 shows a sequence diagram for Case A in which printing is executed using a mediation service.
Figure 4:
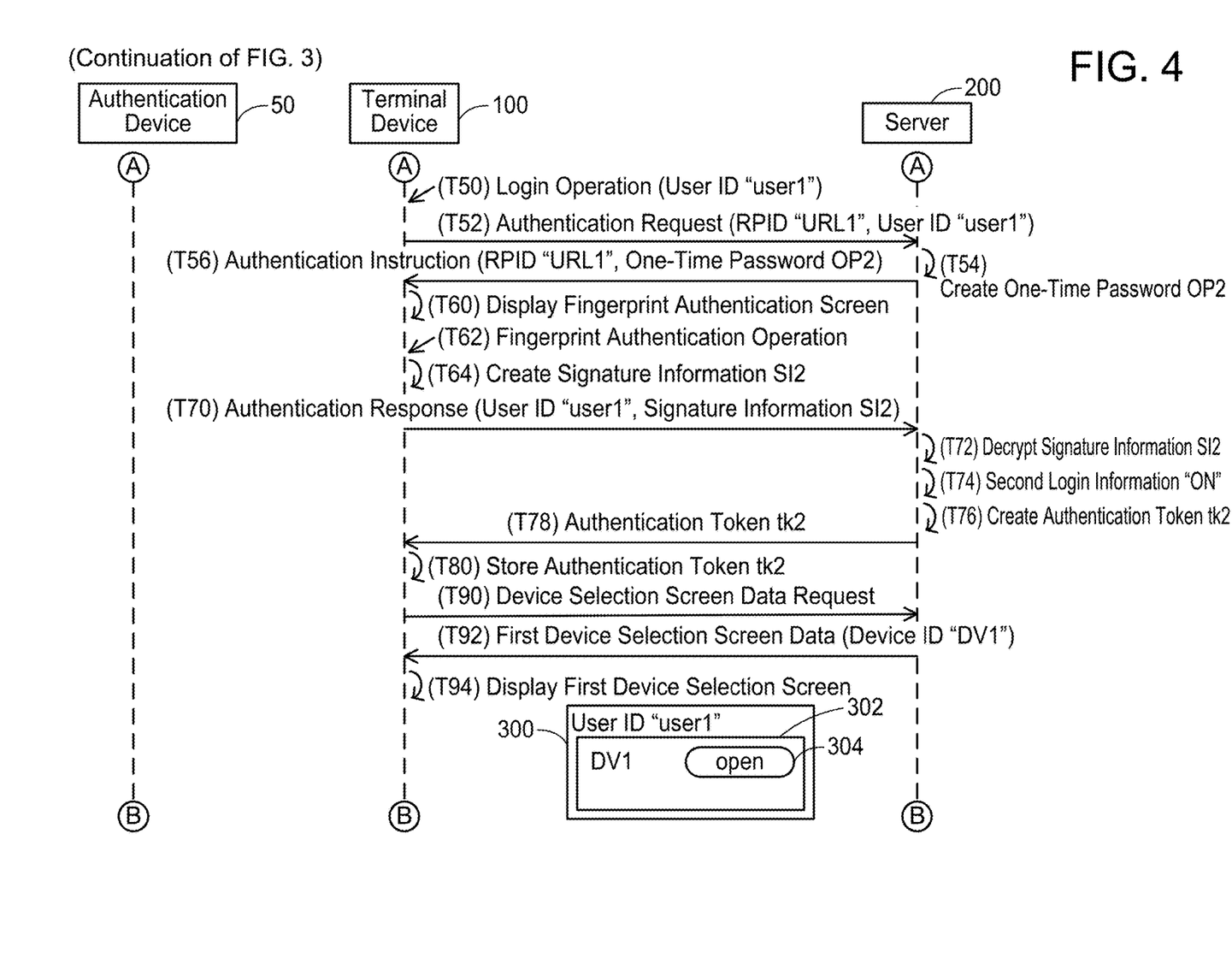
FIG. 4 is a sequence diagram continued from FIG. 3.
Figure 5:
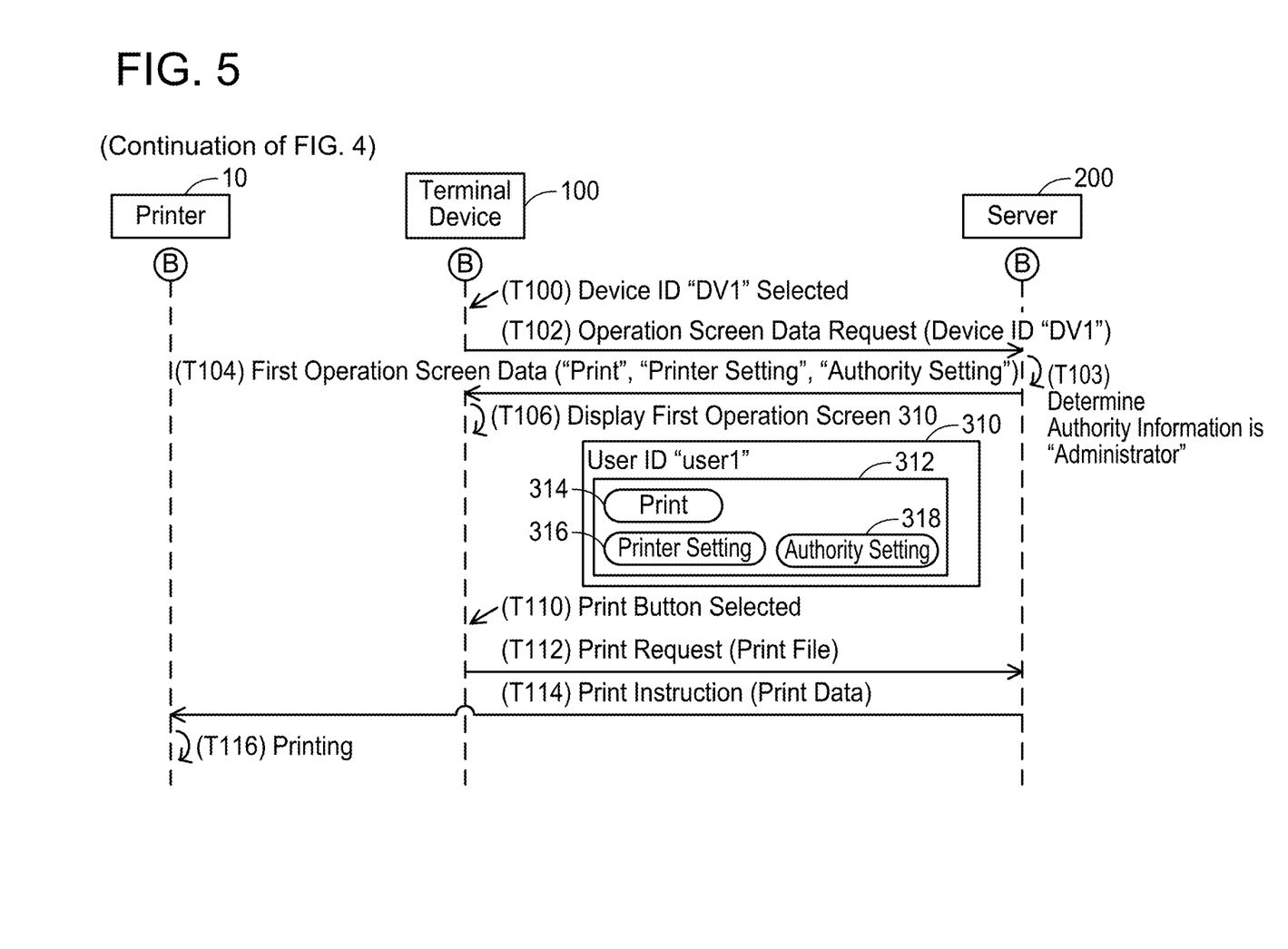
FIG. 5 is a sequence diagram continued from FIG. 4.

(Case A: FIGS. 3 to 5)

Referring to FIGS. 3 to 5, Case A is described. In Case A, printing is executed using the mediation service. In the initial state of Case A, a user ID "user1", public keys PUK1 and PUK2, first login information "OFF", and second login information "OFF" are stored in association with each other in the user table 242 in the server 200. The public keys PUK1 and PUK2 correspond to the private keys PRK1 and PRK2, respectively. Further, the device ID "DV1", capability information "print", the user ID "user1", authority information "administrator", and connection information "Maintain" are stored in association with each other in the first service table 244. Moreover, the second service table 246 is blank. That is, the subscription service is unavailable to the target user. Therefore, an XMPP connection is not being established between the printer 10 and the server 200.

In T10, the target user connects the USB connector of the authentication device 50 to the USB I/F 18 of the printer 10. In response, the printer 10 determines that the authentication device 50 has been connected to the printer 10. In T12, the target user performs a login operation of inputting the user ID "user1" to the printer 10. In response, the printer 10 sends an authentication request including an RPID "URL1" and the inputted user ID "user1" to the server 200 in T14. The URL1 is information for identifying the service the target user uses (i.e., the mediation service). The RPID "URL" is stored in advance in the memory 34 of the printer 10.

In response to receiving the authentication request from the printer 10 in T14, the server 200 creates a one-time password OP1 and stores it in the memory 234 in T16 and sends an authentication instruction including the RPID "URL1" and the one-time password OP1 to the printer 10 in T18. The authentication instruction is a signal for instructing execution of biometric authentication and creation of signature information.

In response to receiving the authentication instruction from the server 200 in T18, the printer 10 displays a fingerprint authentication screen in T20. On the fingerprint authentication screen, a message that prompts fingerprint authentication to be executed using the authentication device 50 is displayed. In T22, the printer 10 sends the one-time password OP1 to the authentication device 50.

In T24, the target user performs a fingerprint authentication operation to the authentication device 50. The authentication device 50 determines that the fingerprint authentication has succeeded since fingerprint information acquired through the fingerprint authentication operation matches the fingerprint information 62 in the memory 60, and creates signature information SI1 by encrypting the received one-time password OP1 with the private key PRK1 in the memory 60 in T26. The authentication device 50 sends the created signature information SI1 to the printer 10 in T28.

In response to receiving the signature information SI1 from the authentication device 50 in T28, the printer 10 sends an authentication response including the user ID "user1" and the signature information SI1 to the server 200 in T30.

In response to receiving the authentication response from the printer 10 in T30, the server 200 specifies the public keys PUK1, PUK2 which are associated with the user ID "user1" included in the response in the user table 242. In T32, the server 200 decrypts the signature information SI1 included in the authentication response using the specified public keys PUK1, PUK2. Since the private key PRK1 and the public key PUK1 are paired, the one-time password OP1 is acquired by decrypting the signature information SI1 with the public key PUK1. Here, the decryption by the public key PUK2 fails. The server 200 determines that the one-time password OP1 acquired by decrypting the signature information SI1 matches the one-time password OP1 stored in the memory 234 (see T16), and thus determines that user authentication for the target user has succeeded. In this case, the server 200 changes the first login information associated with the user ID "user1" in the user table 242 from "OFF" to "ON" in T34. Thus, the target user is logged in the server 200 via the printer 10. The server 200 creates an authentication token tk1 in T36 and sends the authentication token tk1 to the printer 10 in T38.

In response to receiving the authentication token tk1 from the server 200 in T38, the printer 10 stores the authentication token tk1 in the memory 34 in T40. Since no authentication tokens but the authentication token tk1 are stored in the memory 34, the printer 10 determines that the subscription service is unavailable to the target user (which may be termed "unavailable state" hereinafter). In this case, the printer 10 establishes an XMPP connection with the server 200 using the authentication token tk1 in T42. Once the XMPP connection has been established with the server 200, the printer 10 sends device information including the device ID "DV1" and the capability information "print" to the server 200 in T44. As described, in response to receiving the authentication token tk1 from the server 200, the printer 10 establishes an XMPP connection with the server 200 using the authentication token tk1. This allows the server 200 to send a print instruction to the printer 10 thereafter.

In response to receiving the device information from the printer 10 in T44, the server 200 stores the authentication token tk1 in the first service table 244 in association with the device ID "DV1" in T46.

In T50 of FIG. 4, the target user performs a login operation of inputting the user ID "user1" to the terminal device 100. Specifically, the target user inputs the user ID "user1" while a login screen is displayed on the display unit 114 of the terminal device 100. In response, the terminal device 100 sends the authentication request including the RPID "URL1" and the inputted user ID "user1" to the server 200 in T52. The RPID "URL1" is stored in advance in the memory 134 of the terminal device 100.

In response to receiving the authentication request from the terminal device 100 in T52, the server 200 creates a one-time password OP2 and stores the one-time password OP2 in the memory 234 in T54 and sends an authentication instruction including the RPID "URL1" and the one-time password OP2 to the terminal device 100 in T56.

In response to receiving the authentication instruction from the server 200 in T56, the terminal device 100 displays a fingerprint authentication screen in T60. The target user performs a fingerprint authentication operation to the terminal device 100 in T62. The terminal device 100 determines that the fingerprint authentication has succeeded since fingerprint information acquired through the fingerprint authentication operation matches the fingerprint information 142 in the memory 134, and creates signature information SI2 by encrypting the received one-time password OP2 with the PRK2 in the memory 134 in T64. The terminal device 100 sends an authentication response including the user ID "user1" and the signature information SI2 to the server 200 in T70.

In response to receiving the authentication response from the terminal device 100 in T70, the server 200 specifies the public keys PUK1, PUK2 in the user table 242. In T72, the server 200 decrypts the signature information SI2 included in the authentication response using the specified public keys PUK1, PUK2. Since the private key PRK2 and the public key PUK2 are paired, the one-time password OP2 is acquired by decrypting the signature information SI2 using the public key PUK2. Here, the decryption using the public key PUK1 fails. The server 200 determines that the one-time password OP2 acquired by decrypting the signature information SI2 matches the one-time password OP2 stored in the memory 234 (see T54), and thus determines that user authentication for the target user has succeeded. In this case, the server 200 changes the second login information associated with the user ID "user1" in the user table 242 from "OFF" to "ON" in T74. As a result, the target user is logged in the server 200 via the printer 10 and also via the terminal device 100. The server 200 creates an authentication token tk2 in T76 and sends the authentication token tk2 to the terminal device 100 in T78.

In response to receiving the authentication token tk2 from the server 200 in T78, the terminal device 100 stores the authentication token tk2 in the memory 134 in T80 and sends device selection screen data request to the server 200 in T90.

In response to receiving the device selection screen data request from the terminal device 100 in T90, the server 200 determines that the first login information and the second login information in the user table 242 indicate "ON". That is, the server 200 determines that the user authentication in response to the receipt of the authentication request from the printer 10 has succeeded and the user authentication in response to the receipt of the authentication request from the terminal device 100 has also succeeded. The server 200 further determines that the device ID "DV1" has been received from the printer 10. In this case, the server 200 sends first device selection screen data including the device ID "DV1" to the terminal device 100 in T92.

In response to receiving the first device selection screen data from the server 200 in T92, the terminal device 100 displays a first device selection screen 300 corresponding to the first device selection screen data on the display unit 114 in T94. The first device selection screen 300 includes the user ID "user1" corresponding to the logged-in user and a device selection field 302. The device selection field 302 includes the device ID "DV1" and an open button 304 corresponding to the device ID "DV1". In T100 of FIG. 5, the target user selects the open button 304 corresponding to the device ID "DV1". In T102, the terminal device 100 sends the server 200 an operation screen data request that includes the device ID "DV1" corresponding to the open button 304 selected by the target user.

In response to receiving the operation screen data request from the terminal device 100 in T102, the server 200 determines that the authority information associated with the device ID "DV1" and the user ID "user1" in the first service table 244 indicates "administrator" in T103. The server 200 further specifies that the capability information associated with the device ID "DV1" in the first service table 244 indicates "print". In this case, the server 200 sends, to the terminal device 100, first operation screen data that includes information "print" corresponding to a print button, information "printer setting" corresponding to a printer setting button, and information "authority setting" corresponding to an authority setting button in T104.

In response to receiving the first operation screen data from the server 200 in T104, the terminal device 100 displays a first operation screen 310 corresponding to the first operation screen data on the display unit 114 in T106. The first operation screen 310 includes the user ID "user1" corresponding to the logged-in user and a button selection field 312. The button selection field 312 includes a print button 314, a printer setting button 316, and an authority setting button 318. The print button 314 is for selecting to cause the printer 10 to execute the print function. The printer setting button 316 is for displaying a printer setting change screen on the display unit 114 to change the setting of the printer 10. The authority setting button 318 is for displaying an authority information change screen on the display unit 114 to change the authority information of the logged-in user. That is, the first operation screen 310 is a screen for accepting an operation to cause the printer 10 to execute the print function, a screen for changing the printer setting, and a screen for changing the user's authority information. The target user selects the print button 314 in T110. In response, the terminal device 100 determines that it has accepted the operation to cause the printer 10 to execute the print function, and sends a print request including a print file to the server 200 in T112.

In response to receiving the print request from the terminal device 100 in T112, the server 200 converts the print file included in the request to create print data representing an image to be printed in a data format the printer 10 can interpret. In T114, the server 200 sends a print instruction including the created print data to the printer 10 via the XMPP connection. The print instruction is information for causing the printer 10 to execute the print function.

In response to receiving the print instruction from the server 200 in T114, the printer 10 specifies the print data in the print instruction and causes the print engine 16 to execute printing using the print data in T116. As above, the target user can cause the printer 10 to execute the printing using the mediation service.

Figure 6:
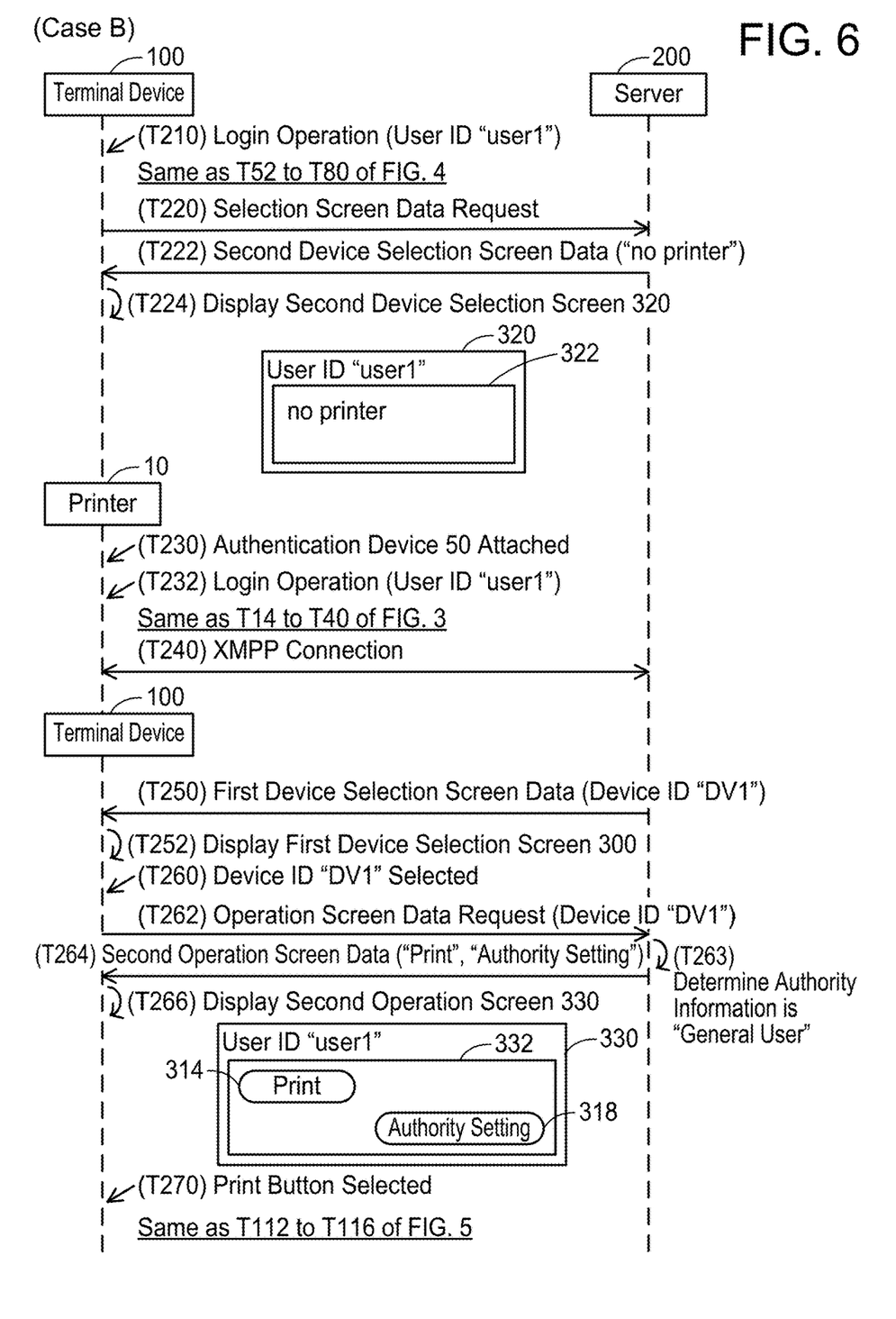
FIG. 6 is a sequence diagram for Case B in which a printer is caused to execute printing via a server.

(Case B: FIG. 6)

Referring to FIG. 6, Case B is described. In Case B, printing is executed using the mediation service. The initial state of Case B is the same as initial state of Case A illustrated in FIGS. 3 to 5, except that the device ID "DV1", the capability information "print", the user ID "user1", authority information "general user", and the connection information "Maintain" are stored in association with each other in the first service table 244.

T210 is the same as T50 in FIG. 4. After this, the same sequence as T52 to T80 in FIG. 4 is executed between the terminal device 100 and the server 200.

In response to receiving a selection screen data request from the terminal device 100 in T220, the server 200 determines that the second login information indicates "ON" and the first login information indicates "OFF" in the user table 242. That is, the server 200 determines that the user authentication in response to the receipt of the authentication request from the terminal device 100 has succeeded but user authentication in response to receipt of an authentication request from the printer has not succeeded. In this case, the server 200 sends second device selection screen data including "no printer" to the terminal device 100 in T222.

In response to receiving the second device selection screen data from the server 200 in T222, the terminal device 100 displays a second device selection screen 320 corresponding to the second device selection screen data on the display unit 114 in T224. The second device selection screen 320 includes the user ID "user1" corresponding to the logged-in user and a device selection field 322. The device selection field 322 includes information "no printer" indicating that there are no selectable printers. The information "no printer" indicates that user authentication using the printer 10 has not succeeded, that is, that an authentication request has not been sent from the printer 10 to the server 200.

T230 and T232 are the same as T10 and T12 in FIG. 3, respectively. After this, the sequence same as T14 to T40 in FIG. 3 is executed between the printer 10, the authentication device 50, and the server 200. As a result, in T240, an XMPP connection is established between the printer 10 and the server 200 using the authentication token tk1.

Once the XMPP connection has been established with the printer 10 in T240, the server 200 determines that the first login information and the second login information in the user table 242 indicate "ON". In this case, the server 200 sends the first device selection screen data including the device ID "DV1" to the terminal device 100 in T250. T252, T260, and T262 are the same as T94 in FIGS. 4, T100 and T102 in FIG. 5, respectively.

In T263, the server 200 determines that the authority information associated with the device ID "DV1" and the user ID "user1" in the first service table 244 indicates "general user". The server 200 further specifies the capability information "print" in the first service table 244. In this case, the server 200 sends, to the terminal device 100, second operation screen data including information "print" corresponding to a print button and information "authority setting" corresponding to an authority setting button in T264.

In response to receiving the second operation screen data from the server 200 in T264, the terminal device 100 displays a second operation screen 330 corresponding to the second operation screen data on the display unit 114 in T266. The second operation screen 330 includes the user ID "user1" corresponding to the logged-in user and a button selection field 332. The button selection field 332 is the same as the button selection field 312 of the first operation screen 310 shown in FIG. 5, except that the former does not include the printer setting button. The target user selects a print button 314 in T270. After this, the sequence same as T112 to T116 in FIG. 5 is executed between the printer 10, the terminal device 100, and the server 200.

(Effects of Cases A, B)

As described for Case A in FIGS. 3 to 5, in the case where the server 200 receives the authentication request from the printer 10 (T14 in FIG. 3), receives the authentication request from the terminal device 100 (T52 in FIG. 4), and receives the device ID "DV1" from the printer 10 (T44 in FIG. 3), the server 200 sends the terminal device 100 the first device selection screen data corresponding to the first device selection screen 300 including the device ID "DV1" (T92 in FIG. 4). This configuration allows the target user to easily select the printer 10 as a printer by which the print function is executed. Therefore, the user's convenience is improved.

As described for Case B in FIG. 6, in the case where the server 200 receives the authentication request from the terminal device 100 (T52 of FIG. 4 cited in FIG. 6) before receiving the authentication request from the printer 10, the server 200 sends the terminal device 100 the second device selection screen data corresponding to the second device selection screen 320. This configuration allows the target user to know that he/she needs to log in the server 200 using the printer 10 in order to use the print function of the printer 10. Therefore, the user's convenience is improved.

As described for Case A in FIGS. 3 to 5, in the case where the server 200 receives the authentication request from the terminal device 100 (T52 in FIG. 4) after having received the authentication request from the printer 10 (T14 in FIG. 3) and having received the device ID "DV1" from the printer 10 (T44), the server 200 sends the first device selection screen data to the terminal device 100 without sending the second device selection screen data to the terminal device 100. This configuration suppresses display of a screen including unnecessary information to the target user.

As described for Case A in FIGS. 3 to 5, in the case where the authority information in the first service table 244 indicates "administrator" (T103 in FIG. 5), the first operation screen 310 includes the print button 314 and the printer setting button 316 (T106). On the other hand, as illustrated for Case B in FIG. 6, in the case where the authority information in the first service table 244 indicates "general user" (T263 in FIG. 6), the second operation screen 330 includes the print button 314 but does not include the printer setting button 316. It is undesirable that the setting of the printer 10 is changed by the target user if the target user is not the administrator of the printer 10. The configuration above allows the setting of the printer 10 to be changed only when the target user is the administrator of the printer 10. Therefore, the printer 10 can be managed appropriately.

Figure 7:
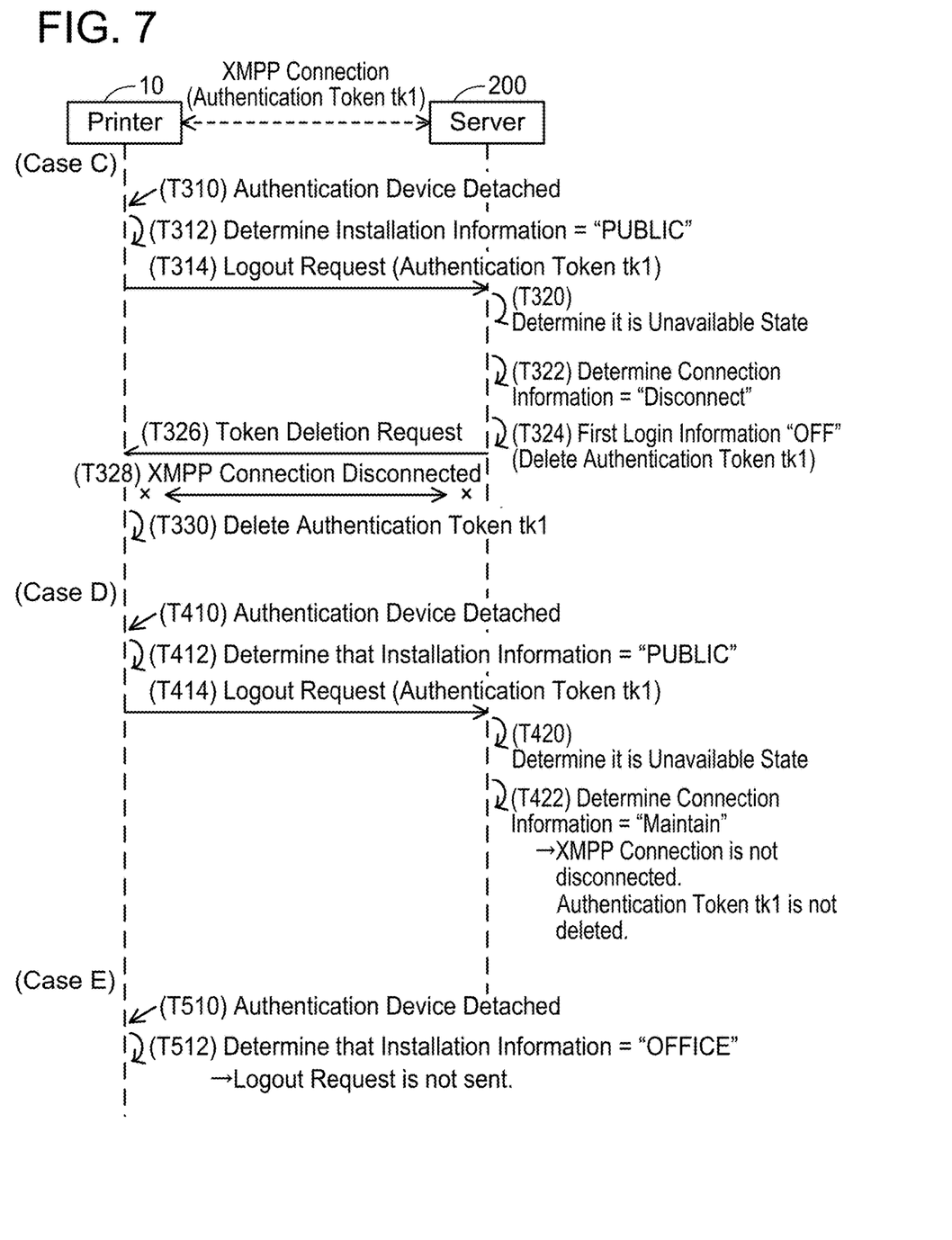
FIG. 7 is a sequence diagram for Cases C to E in which an authentication device is detached from a printer.

(Case C: FIG. 7)

Referring to FIG. 7, Case C is described. In Case C, the authentication device 50 is detached from the printer 10. Case C takes place after Case A shown in FIGS. 3 to 5. That is, an XMPP connection is already established between the printer 10 and the server 200 using the authentication token tk1, and the user ID "user1", the public keys PUK1, PUK2, the first login information "ON", and the second login information "ON" are stored in association with each other in the user table 242. In the present case, "PUBLIC" is stored as the installation information 42 in the memory 34 of the printer 10, and the device ID "DV1" and the user ID "user1" are stored in association with connection information "Disconnect" in the first service table 244.

The target user detaches the authentication device 50 from the printer 10 in T310. In response, the printer 10 determines that the authentication device 50 has been detached from the printer 10 and determines that the installation information 42 in the memory 34 is "PUBLIC" in T312. In this case, the printer 10 decides to disconnect the XMPP connection with the server 200 and to make the target user log out, and then sends a logout request including the authentication token tk1 to the server 200 in T314. The logout request is a signal that requests disconnection of the XMPP connection and a logout of the target user.

In response to receiving the logout request from the printer 10 in T314, the server 200 determines in T320 that it is under the unavailable state because the device ID "DV1" is not in the second service table 246. The server 200 further determines in T322 that the connection information "Disconnect" is associated with the device ID "DV1" and the user ID "user1" in the first service table 244. In this case, the server 200 executes a process for disconnecting the XMPP connection with the printer 10 and a process for making the target user log out in T324. Specifically, the server 200 changes the first login information associated with the user ID "user1" in the user table 242 from "ON" to "OFF" and deletes the authentication token tk1 from the first service table 244 in T324. The server 200 then sends a token deletion request including the authentication token tk1 to the printer 10 in T326.

In response to receiving the token deletion request from the server 200 in T326, the printer 10 specifies the authentication token tk1 included in the token deletion request and specifies that no authentication tokens but the authentication token tk1 are in the memory 34. The printer 10 thus determines that it is under the unavailable state. In this case, the printer 10 executes a process for disconnecting the XMPP connection with the server 200. As a result, the XMPP connection between the printer 10 and the server 200 is disconnected in T328. Once the XMPP connection with the server 200 has been disconnected, the printer 10 deletes the authentication token tk1 from the memory 34 in T330.

(Case D: FIG. 7)

Referring to FIG. 7, Case D is described. In Case D, the authentication device 50 is detached from the printer 10. The initial state of Case D is the same as the initial state of Case C, except that connection information "Maintain" is stored in association with the device ID "DV1" and the user ID "user1" in the first service table 244.

T410 to T414 are the same as T310 to T314 in Case C.

In response to receiving the logout request from the printer 10 in T414, the server 200 determines that it is under the unavailable state in T420. The server 200 further determines that the connection information "Maintain" is in the first service table 244 in T422. In this case, the server 200 decides to maintain the XMPP connection with the printer 10 and to maintain the target user logged in the server 200. Therefore, the server 200 does not send a token deletion request including the authentication token tk1 to the printer 10. Thus, the XMPP connection between the printer 10 and the server 200 is maintained and the target user is maintained logged in the server 200.

(Case E: FIG. 7)

Referring to FIG. 7, Case E is described. In Case E, the authentication device 50 is detached from the printer 10. The initial state of Case E is the same as the initial state of Case C, except that "OFFICE" is stored as the installation information 42 in the memory 34 of the printer 10.

T510 is the same as T210 in Case C. In response, the printer 10 determines that the authentication device 50 has been detached from the printer 10 and determines that the installation information 42 in the memory 34 is "OFFICE" in T512. In this case, the printer 10 determines that the XMPP connection between the printer 10 and the server 200 is to be maintained and that the target user is to be maintained logged in, and does not send a logout request to the server 200. Therefore, the XMPP connection between the printer 10 and the server 200 is maintained and the target user is maintained logged in. When the installation information 42 in the memory 34 is "HOME", the printer 10 does not send a logout request to the server 200 either.

Figure 8:
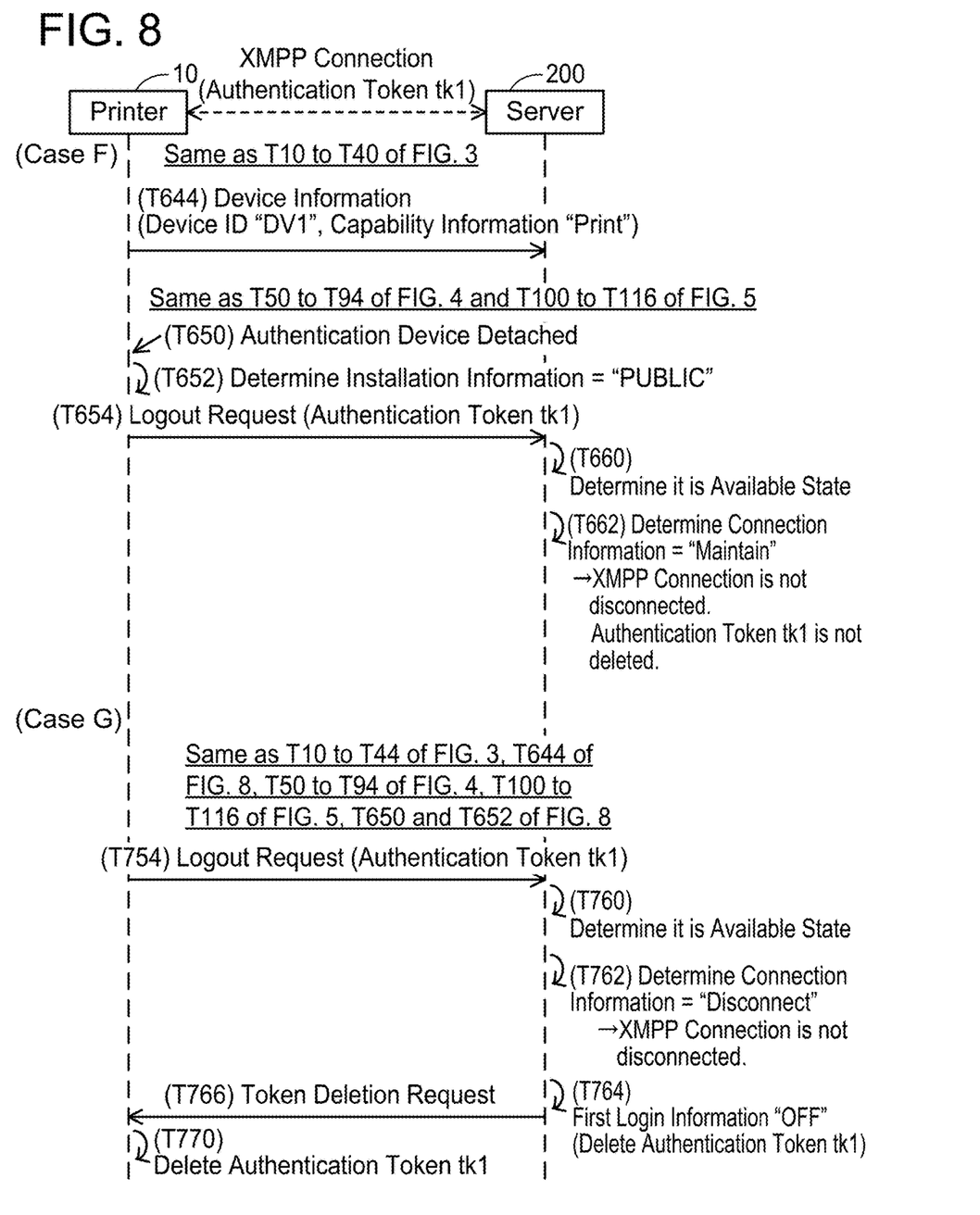
FIG. 8 is a sequence diagram for Cases F and G in which an authentication device is detached from a printer.

(Case F: FIG. 8)

Referring to FIG. 8, Case F is described. In Case F, printing is executed using the mediation service, and thereafter the authentication device 50 is detached from the printer 10. The initial state of Case F is the same as the initial state of Case A shown in FIGS. 3 to 5, except that it is under the available state in which the subscription service is available to the target user. Thus, an XMPP connection is already established between the printer 10 and the server 200 using an authentication token tk11, and the user ID "user1", the device ID "DV1", the authentication token tk11, and remaining amount information "80" are stored in association with each other in the second service table 246 in the server 200.

First, the sequence same as T10 to T40 in FIG. 3 is executed between the printer 10, the authentication device 50, and the server 200. Since the XMPP connection is already established between the printer 10 and the server 200, the printer 10 sends device information including the device ID "DV1" and the capability information "print" to the server 200 in T644 without reestablishing an XMPP connection with the server 200. Thereafter, the sequence same as T50 to T94 in FIGS. 4 and T100 to T116 in FIG. 5 is executed between the printer 10, the terminal device 100, and the server 200.

T650 to T654 are the same as T310 to T314 in FIG. 7. In response to receiving the logout request from the printer 10 in T654, the server 200 determines in T660 that it is under the available state because the device ID "DV1" is in the second service table 246. The server 200 further determines in T662 that the connection information "Maintain" is in the first service table 244. In this case, the server 200 decides to maintain the XMPP connection with the printer 10 and to maintain the target user logged in. Therefore, the server 200 does not send a token deletion request including the authentication token tk1 to the printer 10. Thus, the XMPP connection between the printer 10 and the server 200 is maintained and the target user is maintained logged in.

(Case G: FIG. 8)

Referring to FIG. 8, Case G is described. In Case G, printing is executed using the mediation service, and thereafter the authentication device 50 is detached from the printer 10. The initial state of Case G is the same as the initial state of Case F, except that the connection information "Disconnect" is stored in association with the device ID "DV1" and the user ID "user1" in the first service table 244.

First, the sequence same as T10 to T40 in FIG. 3, T644 in FIG. 8, T50 to T94 in FIG. 4, T100 to T116 in FIG. 5, and T650 and T652 in FIG. 8 is executed between the printer 10, the authentication device 50, the terminal device 100, and the server 200.

In response to receiving the logout request from the printer 10 in T754, the server 200 determines in T760 that it is under the available state. The server 200 further determines in T762 that the connection information "Disconnect" is in the first service table 244. In this case, the server 200 decides to maintain the XMPP connection with the printer 10 and to make the target user log out from the server 200. Therefore, the server 200 changes the first login information in the user table from "ON" to "OFF" and deletes the authentication token tk1 from the first service table 244 in T764. The server 200 then sends a token deletion request including the authentication token tk1 to the printer 10 in T766.

In response to receiving the token deletion request from the server 200 in T766, the printer 10 specifies the authentication token tk1 included in the token deletion request and specifies that the authentication token tk11 but the authentication token tk1 is in the memory 34. Therefore, the printer 10 does not execute the process for disconnecting the XMPP connection with the server 200. The printer 10 deletes the authentication token tk1 from the memory 34 in T770. Thus, the XMPP connection between the printer 10 and the server 200 is maintained and the target user is made to log out from the server 200.

(Effects of Cases C to G)

As described for Case C in FIG. 7, in the case where the server 200 receives the logout request from the printer 10 under the unavailable state (T314), the server 200 disconnects the XMPP connection with the printer 10 (T328). Conversely, as described for Cases F and G in FIG. 8, in the case where the server 200 receives the logout request from the printer 10 under the available state (T654, T754), the server 200 does not disconnect the XMPP connection with the printer 10. If the XMPP connection between the printer 10 and the server 200 is disconnected under the available state, the target user is no longer able to receive the subscription service. The configuration above allows the target user to keep receiving the subscription service. Therefore, the user's convenience is improved.

As described for Case C in FIG. 7, in the case where the server 200 receives the logout request from the printer 10 under the unavailable state (T314) and determines that the connection information "Disconnect" is in the first service table 244 (T322), the server 200 disconnects the XMPP connection with the printer 10 (T328). Conversely, as described for Case D, in the case where the server 200 receives the logout request from the printer 10 under the unavailable state (T414) and determines that the connection information "Maintain" is in the first service table 244 (T422), the server 200 does not disconnect the XMPP connection with the printer 10. Some users wish to use the print function of the printer 10 continuously. The configuration above allows such users to use the print function of the printer 10 continuously by setting the connection information "Maintain" for these users. Therefore, the user's convenience is improved.

As described for Case C in FIG. 7, in the case where the authentication device 50 is detached from the USB interface 18 (T310) and the installation information 42 is "PUBLIC" (T312), the printer 10 sends the logout request to the server 200. Conversely, as described for Case E, in the case where the authentication device 50 is detached from the USB interface 18 (T510) and the installation information 42 is "OFFICE" (T512), the printer 10 does not send a logout request to the server 200. When the installation information 42 is "PUBLIC", a user who will use the printer 10 after the target user is highly probably a third party who is a complete stranger to the target user. In such a situation, it is undesirable that the print function of the printer 10 is maintained executable using the terminal device 100 after the authentication device 50 has been detached from the printer 10. On the other hand, when the installation information 42 is "OFFICE", a user who will use the printer 10 after the target user is highly probably a coworker of the target user. In such a situation, there is no problem if the print function of the printer 10 is maintained executable using the terminal device 100. This is because if the target user causes the printer 10 to execute its print function using the terminal device 100, the resulting printed material will never be seen by a third party. Thus, depending on the installation information 42, the printer 10 can accordingly switch whether to send a logout request to the server 200 or not.

(Effects of Embodiment)

According to the configuration above, in the case where the server 200 receives the authentication request from the printer 10 (T14 in FIG. 3) and also receives the authentication request from the terminal device 100 (T52 in FIG. 4), the server 200 sends the first operation screen data to the terminal device 100 (T104 in FIG. 5). In response to receiving the print request from the terminal device 100 (T112), the server 200 sends the print instruction to the printer 10 (T114). In response to receiving the print instruction from the server 200 (T114), the printer 10 causes the print engine 16 to execute the print function (T116). Thus, the server 200 receiving the authentication requests from the printer 10 and the terminal device 100 triggers the execution of the print function by the print engine 16 of the printer 10.

(Correspondence Relationships)

The printer 10 is an example of "function executing device". The user ID is an example of "user identification information". The authentication request in T14 of FIG. 3 is an example of "first login request". The authentication request in T52 of FIG. 4 is an example of "second login request". The print function is an example of "specific function". The operation in T110 of FIG. 5 is an example of "function executing operation". The first operation screen 310 in T106 of FIG. 5 and the second operation screen 330 in T266 of FIG. 6 are examples of "operation acceptance screen". The first operation screen data in T104 of FIG. 5 is an example of "operation acceptance screen data". The print request in T112 of FIG. 5 is an example of "operation information". The print instruction in T114 of FIG. 5 is an example of "function executing instruction". The device ID "DV1" is an example of "device identification information". The first device selection screen 300 in T94 of FIG. 4 is an example of "selection screen". The first device selection screen data in T92 of FIG. 4 is an example of "selection screen data". The operation screen data request in T102 of FIG. 5 is an example of "selection information". The second device selection screen 320 in T224 of FIG. 6 is an example of "non-reception screen". The second device selection screen data in T222 of FIG. 6 is an example of "non-reception screen data". The authority information "administrator" and "general user" are examples of "administrator information" and "general information", respectively. The print button 314 in the first operation screen 310 and the second operation screen 330 is an example of "first button". The printer setting button 316 in the first operation screen 310 is an example of "second button". The XMPP connection is an example of "constant connection". The subscription service is an example of "service related to the function executing device". The logout requests in T314 and T414 of FIG. 7 and in T654 and T754 of FIG. 8 are examples of "disconnection instruction". The connection information "Maintain" and "Disconnect" are examples of "maintenance information" and "disconnection information", respectively. The authentication token tk1 in T38 of FIG. 3 is an example of "authentication information". The FIDO authentication scheme is an example of "predetermined authentication scheme". The fingerprint information 62 is an example of "biometric authentication information". The USB I/F 18 is an example of "interface". The one-time password OP1 in T18 of FIG. 3 is an example of "verification information". The fingerprint authentication screen in T20 of FIG. 3 is an example of "authentication instruction screen". The installation information 42 "PUBLIC" is an example of "predetermined condition". The installation information 42 "PUBLIC" is an example of "first value". The installation information "OFFICE" and "HOME" are examples of "second value".

T14 in FIG. 3 is an example of "send the server a first login request" by the "function executing device". T52 in FIG. 4 is an example of "send the server a second login request" by the "terminal device". T14 in FIG. 3 is an example of "receive the first login request" by the "server". T52 in FIG. 4 is an example of "receive the second login request" by the "server". T104 in FIGS. 5 and T264 in FIG. 6 are examples of "send operation acceptance screen data" by the "server". T104 in FIGS. 5 and T264 in FIG. 6 are examples of "receive the operation acceptance screen data" by the "terminal device". T106 in FIGS. 5 and T266 in FIG. 6 are examples of "display the operation acceptance screen" by the "terminal device". T112 in FIG. 5 is an example of "send operation information" by the "terminal device". T112 in FIG. 5 is an example of "receive the operation information" by the "server". T114 in FIG. 5 is an example of "send the function executing device a function executing instruction" by the "server". T114 in FIG. 5 is an example of "receive the function executing instruction" by the "function executing device". T116 in FIG. 5 is an example of "cause a function executing engine of the function executing device to execute the specific function" by the "function executing device".

T104 in FIGS. 5 and T264 in FIG. 6 are examples of "send operation acceptance screen data" by the "server".

(Modification 1) The "function executing device" is not limited to a printer, and may be a scanner, an MFP, or the like. If the "function executing device" is a scanner, a scan function is an example of the "specific function" and a scan engine is an example of the "function executing engine". Alternatively, if the "function executing device" is an MFP, a print function, a scan function, or a FAX function is an example of the "specific function", and a print engine, a scan engine, or a FAX engine is an example of the "function executing engine".

(Modification 2) In the embodiment, the target user logs in the server 200 in response to the success of FIDO authentication using biometric authentication. In a modification, the target user may log in the server 200 in response to the success of authentication using a password. In this modification, a combination of the user ID "user1" and the password is stored in the memory 234 in the server 200. Instead of T10 to T12 in FIG. 3, the target user performs a login operation of inputting the user ID "user1" and the password to the printer 10. In this case, the server 200 determines that user authentication for the target user has succeeded since the combination of the user ID "user1" and the password received from the printer 10 is in the memory 234. Further, instead of T50 in FIG. 4, the target user performs a login operation of inputting the user ID "user1" and the password to the terminal device 100. In this case, the server 200 also determines that user authentication for the target user has succeeded. The FIDO authentication may be used for one of the login to the server 200 through the printer 10 and the login to the server 200 through the terminal device 100, and the password authentication may be used for the other.

(Modification 3) T90 to T94 in FIGS. 4 and T100 to T102 in FIG. 5 may be omitted. That is, the server 200 may send the first operation screen data to the terminal device 100 without sending the first device selection screen data to the terminal device 100. In this modification, "send selection screen data" and "receive selection information" may be omitted.

(Modification 4) T222 and T224 in FIG. 6 may be omitted. In this modification, "send non-reception screen data" may be omitted.

(Modification 5) The first service table 244 may not include the "authority information". In this modification, the server 200 sends the same operation screen data to the terminal device 100 regardless of the type of the target user. In this modification, the button selection field of the operation screen may include a print button and a printer setting button.

(Modification 6) In the case where the server 200 receives a logout request from the printer 10, the server 200 may disconnect the XMPP connection with the printer 10 regardless of whether the subscription service is available or not.

(Modification 7) The first service table 244 may not include the "connection information". In this modification, in the case where the server 200 receives a logout request from the printer 10 under the available state, the server 200 maintains the XMPP connection with the printer 10, whereas in the case where the server 200 receives a logout request from the printer 10 under the unavailable state, the server 200 disconnects the XMPP connection with the printer 10.

(Modification 8) The mediation service may not use an XMPP connection. In this modification, T36 to T42 and T46 in FIG. 3 may be omitted. After T34 in FIG. 3, the server 200 sends success information indicating that the user authentication has succeeded to the printer 10. In the case where the printer 10 receives the success information from the server 200, the printer 10 regularly sends an instruction request to the server 200. In the case where the server 200 receives a print request from the terminal device 100 after having sent the success information to the printer 10, the server 200 sends a print instruction to the printer 10 as a response to the instruction request. In this modification, "receive authentication information" and "establish a constant connection" may be omitted.

(Modification 9) The printer 10 may switch whether to send a logout request to the server 200 or not depending on usage history of the printer 10. For example, the printer 10 stores in the memory 34, for each authentication device, history information indicating how many times the authentication device has been connected to the printer 10. The printer 10 sends a logout request to the server 200 when the history information in the memory indicates a predetermined number or more, while the printer 10 does not send a logout request to the server 200 when the history information indicates less than the predetermined number.

(Modification 10) The "service" is not limited to a subscription service, and may be an automatic shipping service, a charging service, or the like. The charging service allows a user to use print sheets according to a fee the user paid in advance.

(Modification 11) The first service table 244 may not be stored in the memory 234 in the server 200. That is, a user ID and a device ID may not be stored in association with each other as information for using the mediation service. In this modification, the server 200 sends the first device selection screen data to the terminal device 100 if a user ID included in an authentication request from the printer 10 matches a user ID included in an authentication request from the terminal device 100. The server 200 then sends the second operation screen data to the terminal device 100 if the server 200 receives an operation screen data request including the device ID "DV1" from the terminal device 100.

(Modification 12) In the embodiment above, the processes shown in FIGS. 3 to 8 are implemented by software (e.g., the programs 40, 140, 240), however, at least one of these processes may be implemented by hardware such as a logic circuit, etc.

What is claimed is:
1. A communication system comprising:
a function executing device;
a terminal device; and
a server,
wherein the function executing device comprises a first controller, and the first controller is configured to send the server a first login request including user identification information for identifying a user,
wherein the terminal device comprises a second controller, and the second controller is configured to send the server a second login request including the user identification information,
wherein the server comprises a third controller, and the third controller is configured to:
 receive the first login request from the function executing device;
 receive the second login request from the terminal device; and
 in a case where the first login request is received from the function executing device and the second login request is received from the terminal device, send operation acceptance screen data corresponding to an operation acceptance screen to the terminal device, the operation acceptance screen being for accepting a function executing operation to cause the function executing device to execute a specific function,
wherein the second controller is further configured to:
 after the second login request has been sent to the server, receive the operation acceptance screen data from the server;
 in a case where the operation acceptance screen data is received from the server, display the operation acceptance screen on a display unit of the terminal device; and in a case where the function executing operation is accepted on the operation acceptance screen, send operation information corresponding to the function executing operation to the server, wherein the third controller is further configured to:
receive the operation information from the terminal device; and
in a case where the operation information is received from the terminal device, send the function executing device a function executing instruction to cause the function executing device to execute the specific function, wherein the first controller is further configured to:
receive the function executing instruction from the server; and
in a case where the function executing instruction is received from the server, cause a function executing engine of the function executing device to execute the specific function.

2. A server comprising:
a controller configured to:
receive a first login request including user identification information for identifying a user from a function executing device;
receive a second login request including the user identification information from a terminal device;
in a case where the first login request is received from the function executing device and the second login request is received from the terminal device, send operation acceptance screen data corresponding to an operation acceptance screen to the terminal device, the operation acceptance screen being for accepting a function executing operation to cause the function executing device to execute a specific function;
after the operation acceptance screen data has been sent to the terminal device, receive operation information corresponding to the function executing operation from the terminal device; and
in a case where the operation information is received from the terminal device, send the function executing device a function executing instruction to cause the function executing device to execute the specific function.

3. The server according to claim 2, wherein
the controller is further configured to:
receive device identification information for identifying the function executing device from the function executing device;
in a case where the first login request is received from the function executing device, the second login request is received from the terminal device, and the device identification information is received from the function executing device, send selection screen data corresponding to a selection screen including the device identification information to the terminal device; and
in response to sending the selection screen data to the terminal device, receive selection information indicating that the device identification information has been selected from the terminal device,
wherein the controller is configured to, in a case where the selection information is received from the terminal device, send the operation acceptance screen data to the terminal device.

4. The server according to claim 3, wherein the controller is further configured to:
in a case where the second login request is received from the terminal device before the first login request is received from the function executing device, send non-reception screen data to the terminal device, the non-reception screen data corresponding to a non-reception screen indicating that the first login request has not been received yet from the function executing device.

5. The server according to claim 4, wherein the controller is configured to:
in a case where the first login request is received from the function executing device and the device identification information is received from the function executing device after the non-reception screen data has been sent to the terminal device, send the selection screen data to the terminal device; and
in a case where the second login request is received from the terminal device after the first login request has been received from the function executing device and the device identification information has been received from the function executing device, send the selection screen data to the terminal device without sending the non-reception screen data to the terminal device.

6. The server according to claim 2, further comprising a memory configured to store the user identification information and authority information in association with each other,
wherein the authority information is one of administrator information indicating that the user is an administrator of the function executing device and general information indicating that the user is a general user different from the administrator,
wherein in a case where the authority information in the memory is the administrator information, the operation acceptance screen includes a first button for accepting the function executing operation and a second button for accepting a setting change operation to change a setting of the function executing device, and
in a case where the authority information in the memory is the general information, the operation acceptance screen includes the first button but does not include the second button.

7. The server according to claim 2, wherein
the server is configured to provide a service related to the function executing device to the user, the service using a constant connection with the function executing device,
wherein the controller is further configured to:
in a case where the first login request is received from the function executing device under an unavailable state in which the service is not available to the user, establish the constant connection with the function executing device,
wherein the controller is configured to:
in a case where the operation information is received from the terminal device, send the function executing instruction to the function executing device via the constant connection,
wherein the controller is further configured to:
receive a disconnection instruction for disconnecting the constant connection from the function executing device; and
in a case where the disconnection instruction is received from the function executing device under the unavailable state, disconnect the constant connection, wherein in a case where the disconnection instruction is received from the function executing device under an available state in which the service is available to the user, the constant connection is not disconnected.

8. The server according to claim 7, further comprising a memory configured to store the user identification information and connection information in association with each other,
- wherein the connection information is one of maintenance information indicating that the constant connection is to be maintained and disconnection information indicating that the constant connection is to be disconnected,
- wherein the controller is configured to:
- in a case where the disconnection instruction is received from the function executing device and the connection information in the memory is the disconnection information under the unavailable state, disconnect the constant connection, and
- wherein in a case where the disconnection instruction is received from the function executing device and the connection information in the memory is the maintenance information under the unavailable state, the constant connection is not disconnected.

9. A function executing device comprising:
- a function executing engine for executing a specific function; and
- a controller,
- wherein the controller is configured to:
- send a first login request including user identification information for identifying a user to a server,
  - wherein the server is configured to:
    - in a case where the first login request is received from the function executing device and a second login request including the user identification information is received from a terminal device, send operation acceptance screen data corresponding to an operation acceptance screen to the terminal device, the operation acceptance screen being for accepting a function executing operation to cause the function executing device to execute the specific function; and
    - in a case where operation information corresponding to the function executing operation is received from the terminal device after the operation acceptance screen data has been sent to the terminal device, send the function executing device a function executing instruction to cause the function executing device to execute the specific function,
- receive the function executing instruction from the server; and
- in a case where the function executing instruction is received from the server, cause the function executing engine to execute the specific function.

10. The function executing device according to claim 9, wherein
- the controller is further configured to:
- after the first login request has been sent to the server, receive authentication information from the server; and
- in a case where the authentication information is received from the server, establish a constant connection with the server by using the authentication information,
- wherein the controller is configured to receive the function executing instruction from the server via the constant connection.

11. The function executing device according to claim 10, wherein
- the function executing device is configured to operate according to a predetermined authentication scheme using a pair of keys,
- the function executing device further comprises an interface to which an authentication device is connected, wherein the authentication device stores the user identification information, biometric authentication information, and a private key in association with each other,
- wherein the controller is configured to, in a case where the authentication device is connected to the interface, send the first login request to the server,
- wherein the controller is further configured to:
- in response to sending the first login request to the server, receive verification information from the server;
- in a case where the verification information is received from the server, display an authentication instruction screen on a display unit of the function executing device, the authentication instruction screen is for prompting the user to perform authentication using the authentication device;
- in the case where the verification information is received from the server, send the verification information to the authentication device;
- in a case where authentication for the user using the authentication device based on the biometric authentication information succeeds after the authentication instruction screen has been displayed, receive signature information from the authentication device, wherein the authentication device creates the signature information by encrypting the verification information with the private key;
- in a case where the signature information is received from the authentication device, send the user identification information and the signature information to the server, wherein the server is configured to decrypt the signature information by using a public key stored in the server in association with the user identification information; and
- in a case where the authentication device is detached from the interface and a predetermined condition is satisfied, send the server a disconnection instruction to disconnect the constant connection, wherein in a case where the authentication device is detached from the interface and the predetermined condition is not satisfied, the disconnection instruction is not sent.

12. The function executing device according to claim 11, further comprising a memory configured to store a setting value related to disconnection of the constant connection,
- wherein in a case where the setting value is a first value, the predetermined condition is satisfied, and
- in a case where the setting value is a second value, the predetermined condition is not satisfied.

* * * * *